2,796,749

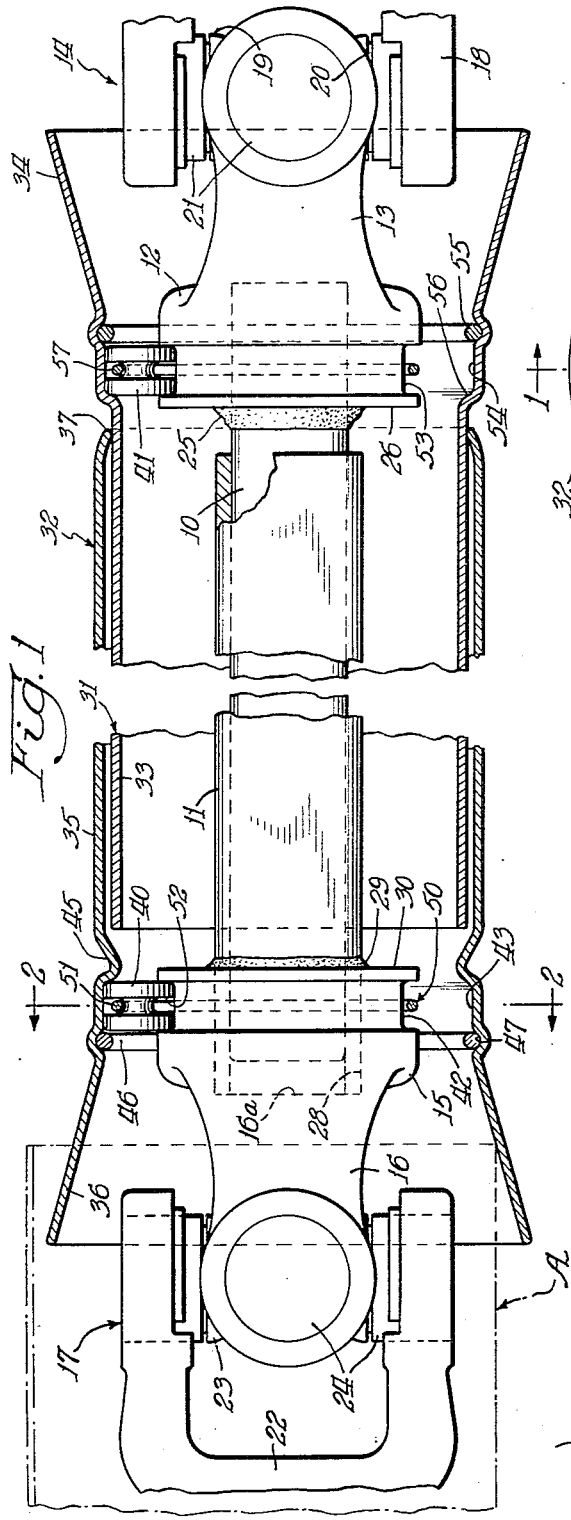
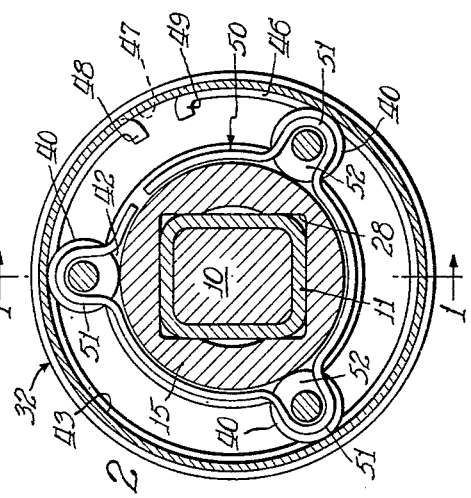
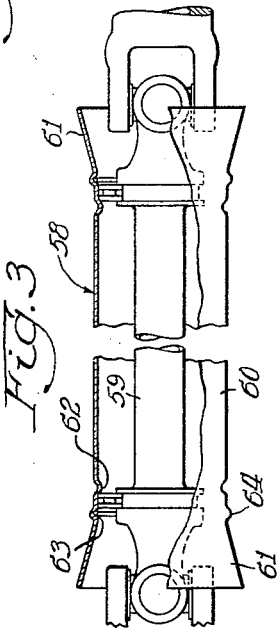

Patented June 25, 1957

2,796,749
SHIELD FOR DRIVE MECHANISM

Archibald A. Warner, Rockford, Ill., assignor to Borg-Warner Corporation, Chicago, Ill., a corporation of Illinois Application April 19, 1955, Serial No. 502,315

6 Claims. (Cl. 64—4)

This invention relates to guard covers for drive mechanisms and more particularly to such covers for exposed rotating drive mechanisms to protect the operator from injury during operation thereof.

An object of the invention is to provide improved guard covers for drive mechanisms to protect the operator when the drive mechanisms are in operation.

Another object of the invention is to provide improved guard covers for assemblies of universal joints and shafts, and in which the shafts may be telescoped for relative axial movement in operation.

Another object of the invention is to provide improved guard covers for drive mechanisms embodying universal joints and which encloses the drive mechanisms in a manner affording adequate protection of the operator during operation thereof while permitting foreign material, such as dirt, to be evacuated from the drive mechanisms.

A further object of the invention is to provide improved guard covers for drive mechanisms which cover can be readily assembled with the drive mechanisms, and can be readily removed from the drive mechanisms for servicing the covers or drive mechanisms, by the operator with simple hand tools.

A further object of the invention is to provide improved guard covers for drive mechanisms which are economical to manufacture; easily and quickly mounted and fastened in position for use, and readily removed; durable; and affords maximum protection of the operator.

Other objects and advantages of the invention will become apparent from the following specification taken together with the accompanying drawing, in which:

Fig. 1 is a longitudinal sectional view of a drive mechanism with telescoping shafts, the mechanism having applied thereto a guard cover constructed according to the present invention, said section being taken on line 1—1 of Fig. 2.

Fig. 2 is a cross-sectional view taken substantially along the line 2—2 of Fig. 1.

Fig. 3 is a longitudinal sectional view of a drive mechanism with a single shaft, the mechanism being applied thereto a guard cover forming a modification of the invention.

Referring to Fig. 1, as an example of one form in which the invention may be embodied, there is shown a drive mechanism comprising a pair of torque-transmitting members or telescoping axially aligned shafts 10 and 11, the solid shaft 10 being positioned within the sleeve shaft 11 and connected to the hub 12 of a yoke 13 of a universal joint indicated at 14, and the sleeve shaft 11 being connected to the hub 15 of a yoke 16 of a universal joint 17. The universal joint 14 comprises the yoke 12 and a yoke 18 connected by an intermediate transmission member or spider 19 having four trunnions 20 ninety degrees apart and received within bearing cups 21 held by the arms of the yokes. The universal joint 17 is identical to the joint 14, comprising the yoke 16, yoke 22, spider 23 and bearing cups 24.

The solid shaft 10 is rectangular in cross-section, as seen in Fig. 2, and has one end extending within a similarly shaped opening in the hub 12 of the yoke 13, the shaft 10 being secured to the hub 12 by a weld 25 connecting the shaft to the flat end surface 26 of the hub 12. The sleeve shaft 11 is also rectangular in cross-section for receiving the shaft 10, and has one end extending within the similarly shaped opening 28 in the hub 15 of the yoke 16, the shaft 11 being secured to the hub 16 by a weld 29 connecting the shaft to the flat end surface 30 of the hub 16. The shaft 11 is spaced from the yoke 13 and the shaft 10 is spaced from the end wall 16a of the hub 15 defining the bottom of the opening 28 therein to permit relative axial movement of the shafts 10 and 11 during operation of the drive mechanism. It will be apparent that rotation of the yoke 22 will cause rotation of the yoke 16, the sleeve shaft 11 and the shaft 10, and the joint 14, the driving connection between the shafts 10 and 11 allowing relative axial displacement between the shafts occasioned by relative bodily displacement between the universal joints 14 and 17 as required in certain applications including equipment used in agricultural implement fields.

In utilizing rotating drive mechanisms, such as described, in machines where the drive mechanisms are exposed, such as between an agricultural tractor and implement, considerable danger of injury to the operator of the machines is present. The present invention is primarily directed to providing a shield or guard to cover the drive mechanism to adequate protect the operator while the machine is in operation, and which may be readily assembled with the drive mechanism and easily removed by the operator for servicing the guard or the drive mechanism by a simple hand tool, such as a screwdriver.

The shield or guard cover of the present invention comprises a plurality of telescoping tubes 31 and 32 of sheet metal and supported on the yokes 13 and 16, respectively, and enclosing shafts 10 and 11 and the major portions of the joints 14 and 17. More particularly, the tube 31 has a cylindrical portion 33 surrounding the shafts 10 and 11 and is provided with a flared end defining a frusto-conical or bell-shaped portion 34 surrounding the yoke 13 and portions of the yoke 18 and spider 19, the opposite end of the tube being spaced from the hub 15 as seen in Fig. 1. The tube 32 is larger in diameter than the tube 31 and is similar to the tube 31. The tube 32 has a cylindrical portion 35 surrounding and telescoping the cylindrical portion of the tube 31 and having a flared frusto-conical end portion 36 enveloping the yoke 16 and portions of the yoke 22 and spider 23. The tube 32 has an inwardly turned end providing a flange 37 having circular contact with the cylindrical portion 33 of the tube 31, the flange 37 being axially spaced from the bell-shaped portion 34 of the tube 31.

The tubes 31 and 32 are supported and rotate with the shafts but may be stopped or rotated relative to the shafts if the operator of a tractor or farm implement, such as a mower, should fall or step on the shield during transmission of power and rotation by the shafts, the tractor and mower being connected to each other by a separate hitch (not shown) pivotally connecting the same and which may be of the ball and socket type to permit the tractor to pull the mower during operation and allow relative axial movement of the shafts 11 and 10 which are respectively connected to the tractor and the mower. As seen in Fig. 1 the tractor is customarily provided with a guard A fixed thereto overlying the yoke 22.

To permit rotation of the shafts 10 and 11 relative to the tubes 31 and 32 and axial movement of the tubes 31 and 32 with the shafts 10 and 11, dumbbell type rollers 40 are disposed between the yoke 16 and the tube 32 and similar rollers 41 are positioned between the yoke 13 and tube 31. More particularly, three rollers 40 are disposed equidistantly circumferentially of the hub 15 of the yoke 16, the rollers being received within an annular groove or raceway 42 in the hub 15, and a raceway 43 formed by the cylindrical inner surface of the tube 32, the rollers being prevented from moving axially of the hub 15 by the side walls of the groove 42 engaging the sides of the rollers, and the rollers being prevented from movement axially of the tube 32 by a circular rib 45, formed on the tube 32 and extending inwardly to engage the adjacent sides of the rollers and also an annular expansion spring or snap ring 46 seated in a groove 47 in the inner surface of the tube 32 and engaging the other and adjacent sides of the rollers. The spring 46 is split to provide two ends 48 and 49 which may be grasped to contract the spring for insertion in the groove 47 in the tube and allowed to expand to seat in the groove 47. To maintain the rollers equidistantly spaced about the circumference of the hub 15 of the yoke 16, a spring wire retainer 50 surrounds the rollers 40 and hub 15 of the yoke 16 and is received within the raceway 42 in the hub, the retainer being provided with loop portions 51 received within the annular groove 52 in the rollers and extending about the reduced centrally located connecting bar portion of the dumbbell rollers. The retainer 50 is split as shown in Fig. 2 to allow expansion thereof to position the retainer in the grooves in the roller and contraction thereof to engage the loop portions of the retainer with the rollers.

The tube 31 is similarly connected to the hub 12 of the yoke 13 for movement axially therewith and relative to the tube 32 and for rotation of the yoke 13 and shaft 10 relative to the tube 31 by the three dumbbell type rollers 41 received within an inner raceway or groove 53 in the hub 12 of the yoke 13 and engaging the outer raceway 54 formed by the inner cylindrical surface of the tube 31, the rollers being retained in assembly with the tube 31 by the expansion spring 55 and a shoulder 56 on the tube 31 and being disposed equidistantly about the hub 12 by a spring wire retainer 57, as previously described in relation to the assembly of yoke 16, tube 32 and rollers 40.

It will be apparent from the description that the tubes 31 and 32 may move relative to each other in an axial direction to conform to the relative axial adjustment of the shafts 10 and 11 and during the conjoint rotation of the shafts 10 and 11 to afford a shield or guard cover protective of the operator of the machines to which the shafts are attached.

As the rollers are of uniform dimensions and rotate about a common axis of the shafts, there is a true roller bearing action of the rollers. Also, each tube is formed as a single sheet metal stamping to avoid welds allowing a substantially longer over-lap of the shield tubes with the same length of shafting for greater strength.

Fig. 3 illustrates a modification of the invention in which the shield comprises a single tube 58 surrounding a shaft 59 and having yokes at opposite ends thereof rotatably connected to the tube in the manner previously described with respect to the structure shown in Figs. 1 and 2. The tube 58 is formed of sheet metal and has a cylindrically shaped portion 60 and bell-shaped portions 61, 61. The shield is provided with an inwardly projecting rib 62, and a groove 63 formed by an outwardly projecting rib 64, at each end of the cylindrical portion thereof merging with the bell-shaped portions 61, 61, the rib 62 engaging the sides of the rollers and the groove 63 receiving a snap ring cooperating with the rib 62 to hold the rollers in position on the tube 58 and yoke.

An important feature of the invention is the ready and simple assembly of the shield to the drive mechanism at each end of the drive mechanism in which the rollers are placed in the loop portions of the spring retainer and this assembly is positioned within the groove of the yoke, the shaft with the connected universal joint are moved into the telescoped tubes until the rollers abut against the shoulder or rib on a tube, the snap ring is slipped over the universal joint, and, as the ears of the snap ring are slightly bent out of the plane of the ring and facing outwardly of the tube, the ears of the snap ring are pressed down into the groove in the tube by the use of a screwdriver, the screwdriver then engaging the opposite side of the ring to force it downwardly until it snaps completely into the groove.

The assembly of the shafts, joints and shield may be easily serviced for repairs or replacement by merely removing the snap ring from each tube by placing the blade of a screwdriver under and behind one of the ears of the snap ring and lifting the end of the ring from the groove in the tube and, with an upward pressure, sliding the screwdriver around the snap ring until the ring is completely free of the retaining groove and can be removed over the universal joint allowing the shield to be slid over the universal joint and removed; the two ends of the spring wire roller retainer may then be separated until the rollers slip over and off the yoke on which they are mounted to completely disassemble the shield.

A further feature of the invention is that the bell-shaped portions 34 and 36 of the tubes 31 and 32 or tube 58 allows sufficient space to accommodate any extreme angularity of universal joint operation. It may also be noted that the spacing of the tubes or tube from the shaft or shafts and yokes by the large rollers provides an open construction of the assemblies permitting any foreign matter, such as dirt, to fall out to prevent damage of the assembly.

While I have described my invention in connection with two specific embodiments thereof, it is to be understood that this is by way of illustration and not by way of limitation and the scope of my invention is defined solely by the appended claims which should be construed as broadly as the prior art will permit.

I claim:

1. In combination, a rotatable shaft, a universal joint at one end of said shaft and including a member connected to said one end of said shaft for rotation of said universal joint therewith, said member having an annular channel therearound, a tubular guard surrounding said shaft and universal joint and having an annular groove and rib on its inner surface in axially spaced relation to each other, a plurality of roller bearings between said guard and said member, said roller bearings being positioned in said annular channel in said member and engaging the inner surface of said guard between said rib and groove of said guard, and a ring disposed in said groove in said guard and cooperating with said rib to prevent axial movement of said roller bearings relative to said guard, the side walls of said annular channel preventing axial movement of said roller bearings relative to said universal joint member.

2. In combination, a rotatable shaft, a universal joint at one end of said shaft and including a member secured to said shaft end, said member having an annular channel therearound defining a cylindrical surface, a tubular guard concentrically surrounding said shaft and said universal joint, a plurality of dumbbell-shaped roller bearings having spaced end roller portions and a peripheral groove, said roller bearings being disposed in said annular channel and in engagement with said cylindrical surface and said guard, and retainer means for peripherally spacing said rolelr bearings and disposed around said member, said retainer means including a plurality of peripherally spaced substantially U-shaped means defining openings for receiving the grooved peripheral portions of said bearings between the end roller portions thereof.

3. In combination, rotatable shaft means, universal joints at opposite ends of said shaft means and including members connected to said ends of said shaft means, said members each having an annular channel therearound defining a cylindrical surface, tubular guard means telescoping said shaft means and said universal joints, bearing means including dumbbell type roller bearings each having a generally central annular groove, said roller bearings being disposed in said annular channels and engaging said guard means for enabling rotation of said shaft means and universal joints relative to said guard means, and peripherally extending retaining means having a plurality of peripherally spaced substantially U-shaped means defining openings received by the grooves of said roller bearings for maintaining the peripheral spacing of said roller bearings within said annular channel.

4. In combination, rotatable shaft means, universal joints at opposite ends of said shaft means and including members connected to said ends of said shaft means, tubular guard means telescoping said shaft means and said universal joints, and bearing means disposed between and connecting said guard means and said universal joints for rotation of said shaft means and said universal joints relative to said guard means, said bearing means comprising dumbbell type roller bearings each having a generally central annular groove, peripherally extending retainer means disposed around each of said members, said retainer means respectively including a plurality of peripherally spaced substantially U-shaped means defining recesses, the central grooved portions of said bearings being respectively received within said recesses, said guard means being formed of tubular shape and having annular shoulders and annular grooves at opposite ends thereof, the annular shoulders being axially spaced a lesser distance than said annular grooves and one side of the bearings abutting said annular shoulders, and rings disposed in said annular grooves and cooperating with said shoulders to maintain said roller bearings against axial movement relative to said tubular guard means.

5. In combination, a shaft assembly including telescoping coaxially adjustable and conjointly rotatable driving and driven shafts, universal joints at opposite ends of said assembly and including members respectively connected to said shafts, a guard having open ends surrounding said shafts and universal joints, said guard including a pair of telescoping tubular elements, a portion of one of said tubular elements surrounding one member and a portion of the other of said tubular elements surrounding the other member, said portions each having a shoulder and a groove in axially spaced relation, a pair of sets of dumbbell-shaped roller bearings respectively between and engaging each member and the tubular element portion surrounding the same for enabling rotation of said shafts and universal joints relative to said tubular elements, the bearings of each set being disposed between the shoulder and groove of the engaged tubular element portion, and resilient rings respectively received within said grooves and cooperating with said shoulders to prevent axial movement of said bearings relative to the tubular element portion and member engaged therewith, and said rings being accessible from the open ends of said guard.

6. In combination, a shaft assembly including telescoping coaxially adjustable and conjointly rotatable driving and driven shafts, universal joints at opposite ends of said assembly and including members respectively connected to said shafts, a guard having open ends surrounding said shafts and universal joints, said guard including a pair of telescoping tubular elements, a portion of one of said tubular elements surrounding one member and a portion of the other of said tubular elements surrounding the other member, said portions each having a shoulder and a groove in axially spaced relation, a pair of sets of dumbbell-shaped roller bearings respectively between and engaging each member and the tubular element portion surrounding the same for enabling rotation of said shafts and universal joints relative to said tubular elements, each of said roller bearings having spaced end roller portions and a central groove, a pair of retainer means for respectively peripherally spacing said sets of roller bearings between the engaged members and tubular element portions, said retainer means respectively including a plurality of peripherally spaced substantially U-shaped means defining recesses for receiving the grooved central portions of the roller bearings between the end roller portions thereof, the bearings of each set being disposed between the shoulder and groove of the respective engaged tubular element portion, and resilient rings respectively received within said grooves and cooperating with said shoulders to prevent axial movement of said bearings relative to the tubular element portion and member engaged therewith, and said rings being acessible from the open ends of said guard.

References Cited in the file of this patent

UNITED STATES PATENTS

| 1,024,132 | Heaslet | Apr. 23, 1912 |

FOREIGN PATENTS

| 22,667 | Great Britain | Oct. 28, 1898 |
| 23,051 | Great Britain | Oct. 18, 1906 |